United States Patent [19]
Lerouge et al.

[11] Patent Number: 5,655,405
[45] Date of Patent: Aug. 12, 1997

[54] MOTORIZED REDUCTION GEAR UNIT, ESPECIALLY FOR A VEHICLE SCREEN WIPING APPARATUS

[75] Inventors: Dominique Lerouge, Lamor Lake; Raphaël Meneguz, Chatellereault; Pascal Stelmarski, Poitiers; Eric Gallaud, Chatellereault, all of France

[73] Assignee: Valeo Systemes D'Essuyage, La Verriere, France

[21] Appl. No.: 462,841

[22] Filed: Jun. 5, 1995

[30] Foreign Application Priority Data

Jun. 3, 1994 [FR] France ................... 94 06977

[51] Int. Cl.[6] ................ F16H 21/40; B60S 1/08; F16D 63/00
[52] U.S. Cl. ................ 74/42; 15/250.3; 188/83
[58] Field of Search ............. 74/42, 411.5; 188/83; 15/250.3

[56] References Cited

U.S. PATENT DOCUMENTS

| | | | |
|---|---|---|---|
| 2,185,109 | 12/1939 | Williams et al. | 188/83 X |
| 2,682,935 | 7/1954 | Blough | 188/83 X |
| 2,832,443 | 4/1958 | Dunham | 188/83 |
| 2,939,335 | 6/1960 | Braund et al. | 188/83 X |
| 5,182,957 | 2/1993 | Bohmer | 74/42 |
| 5,203,219 | 4/1993 | Blanchet | 74/42 |

FOREIGN PATENT DOCUMENTS

| | | |
|---|---|---|
| 0479673 | 10/1991 | European Pat. Off. . |
| 2603358 | 3/1988 | France . |
| 3247421 | 7/1984 | Germany . |
| WO91-00203 | 1/1990 | WIPO . |
| WO93-12957 | 12/1991 | WIPO . |

OTHER PUBLICATIONS

French Search Report, Feb. 24, 1995.

*Primary Examiner*—Allan D. Herrmann
*Attorney, Agent, or Firm*—Morgan & Finnegan, L.L.P.

[57] ABSTRACT

A motorised reduction gear unit, especially for a vehicle screen wiping system, comprises a hollow casing closed by a cover plate, and, within the casing, a toothed wheel which is rotatable about an axis and which carries a pin parallel to the toothed wheel axis and eccentric with respect to the axis. This pin drives a crank and connecting rod unit to convert continuous rotation of the toothed wheel into an alternating motion of an output shaft. The output shaft is provided with braking means for applying braking action to its rotation.

19 Claims, 3 Drawing Sheets

MOTORIZED REDUCTION GEAR UNIT, ESPECIALLY FOR A VEHICLE SCREEN WIPING APPARATUS

FIELD OF THE INVENTION

The present invention relates to a motorised reduction gear unit, especially for a vehicle screen wiping apparatus.

BACKGROUND OF THE INVENTION

It is known to provide a motorised reduction gear unit comprising an electric motor, the rotor shaft of which is extended so as to carry or incorporate a worm which penetrates into a hollow casing which contains a speed reduction mechanism, the casing being closed by a cover plate. The speed reduction mechanism, or system, comprises a toothed wheel which is driven in rotation by the worm and which acts, through an eccentric axis or gudgeon pin carried by the toothed wheel, a crank and connecting rod system. The crank and connecting rod system converts the continuous rotary motion of the toothed wheel (and therefore of the motor) into alternating rotary motion of an output shaft, which is carried by the casing and which passes through the base of the casing for connection to the remainder of the screen wiping apparatus. In this connection, the output shaft is connected conventionally to at least one screen wiper consisting of a screen wiper arm and a wiper blade which wipes over a predetermined angular sector of the windshield of the vehicle.

Because of the development of windshields which have become more and more panoramic in design, and which have also become inclined more and more with respect to the vertical, the size of the associated screen wipers has to be increased. A consequence of this is that they are also becoming heavier. In addition, the wiping angle traversed by the screen wipers is becoming greater and greater, and may reach 180 degrees.

This leads to various problems in connection with the drive system which is provided for the screen wiper. In this connection, as has been seen above, the output shaft is driven by a crank and connecting rod system in which the connecting rod consists of an arm which is connected at one end to the eccentric gudgeon pin carried by the toothed wheel; while, at its other end, the arm has a toothed sector which meshes with another toothed sector, this other toothed sector being coupled fixedly to the output shaft.

While the windshield wiper is moving over a zone going from its parking position to a position at 90 degrees from the parking position, the two toothed sectors of the drive system cooperate fully with each other, and the wiping motion is regular. By contrast, once the wiper has passed beyond this zone, and is traversing an angular sector which is more than 90 degrees away from its parking position, the windshield wiper now has sufficient stored inertia for the wiper itself to become a motor element with respect to the motorised reduction gear unit. It thus happens that the toothed sectors are no longer fully in mesh. The teeth of the toothed sector which is connected to the output shaft are therefore able to escape from the teeth of the other toothed sector, i.e. the one which is situated at the end of the arm driven by the toothed wheel. When this happens, the screen wiper is no longer in controlled movement as it passes over the zone concerned, and it may no longer be being driven by the electric motor.

In addition, when the screen wiper changes direction so as to start back towards its parking position, a sudden jolt or shock is produced at the instant when the teeth of the two toothed sectors meet. This gives rise to noises and also to irregularities in the wiping action, which can be disagreeable to the occupants of the vehicle.

Solutions have been proposed for the problem of reducing these shocks in the extreme wiping positions. For example, U.S. Pat. No. 5,182,957 and European published patent specification EP 0 498 949A describe end stops based on the following principle, to act as abutments at the end of travel of the wiper.

An annular stop member surrounds the output shaft and is coupled to the latter for rotation with it. It is provided with a lug which slides in a groove surrounding the output shaft. This groove has at both its ends, corresponding to the extreme wiping positions, resilient elements into which the lug of the stop member enters when the screen wiper reaches its extreme positions. The effect of this is to reduce shocks in the screen wiper and the resulting noise. However, this does not resolve the problem of acceleration of the screen wiper when it passes beyond the wiping position at 90 degrees away from its parking position. In addition, that solution involves adding to the reduction gear apparatus a plurality of components of complex design, which complicates manufacture of the unit.

DISCUSSION OF THE INVENTION

A means is therefore sought that is simple and inexpensive, for obtaining regular and silent wiping action, and in which variations in the load torque of the motor are limited, as are variations in the coefficient of friction between the wiper and the glass being swept, as sensed by the motor.

An object of the invention is to provide such a means.

According to the invention, a motorised reduction gear unit, especially for a vehicle screen wiping apparatus, comprises, within a hollow casing having a cover plate, a toothed wheel which is rotatable about an axis and which carries a gudgeon pin, the pin being parallel to the axis and eccentric with respect to the latter, the toothed wheel driving a crank and connecting rod system which converts continuous rotation of the toothed wheel into alternating rotary movement of an output shaft, the unit being characterized in that the output shaft includes means for applying rotary braking to it. In a unit according to the invention, a constant braking force is applied to the output shaft.

According to a preferred feature of the invention, the braking means comprise a friction pad, fixed to the output shaft for rotation with the latter and arranged to rub frictionally against one of the elements consisting of the cover plate and the casing which encloses the reduction mechanism.

According to another preferred feature of the invention, the friction pad of the braking means is disposed at the end of the output shaft.

According to a further preferred feature of the invention, the braking means includes a support member disposed at the end of the output shaft, the support member carrying a friction pad which is fixed to the support member for rotation with it and which is arranged for rubbing frictionally on the cover plate.

According to yet another preferred feature of the invention, the support member has the general form of a dish, and the friction pad has a form which is complementary to the dish.

According to yet another preferred feature of the invention, the support member for the friction pad has at least one groove in the lateral portion of the support member, the groove cooperating with at least one projection disposed at the periphery of the friction pad. In this way, the friction pad is coupled with the support member for rotation with the latter.

According to still a further preferred feature of the invention, the lateral portion of the support member has at least one flat surface on its periphery.

According to another preferred feature of the invention, the lateral portion of the support member has two diametrically opposed flat surface portions.

Other preferred features of the invention propose that the support member contains a resilient engagement means acting on the friction pad, the resilient engagement means being constituted by a resilient ring which is disposed under the friction pad, the resilient ring being circular and having a dimension smaller than that of the friction pad. Because of this ring, the engagement of the friction pad on the cover plate is regular, and elastic at the same time, and this enables the axial clearance that can exist in the region of the output shaft to be taken up.

In one form of unit according to the invention, the support member of the friction pad includes at least one lug projecting from the outer edge of the lateral portion of the support member, this lug being bent back and inserted into at least one rebate formed in the periphery of the friction pad. The lug retains the friction pad in its support member, and this facilitates handling of the assembly which consists of the support member, the resilient ring and the friction pad during assembly of the motorised reduction gear unit according to the invention.

In a preferred feature of the invention, the support member of the friction pad is fitted into a bore arranged at the end of the output shaft, and is fixed to the output shaft for rotation with it. A spigot or shank of the support member, projecting from the body (e.g. the above mentioned dish-shaped portion) of the support member, has at least one longitudinal rib which is adapted to be inserted into at least one groove formed in the bore defined at the end of the output shaft. This enables the support member and the output shaft to be connected together in fixed relationship, and prevents any rotary movement of the support member from taking place with respect to the output shaft.

According to another preferred feature of the invention, the support member for the friction pad includes a central annular ring which surrounds the end portion of the output shaft, to which it is fixed. This prevents rotation of the support member with respect to the output shaft.

According to yet another preferred feature of the invention, the friction pad is generally circular in shape, having a diameter substantially equal to the internal diameter of the support member.

According to a further preferred feature of the invention, the friction pad has at least one flat peripheral surface portion.

According to still another preferred feature of the invention, the friction pad has two diametrically opposed flat peripheral surface portions. Thus, the shape of the friction pad is complementary to that of the support member, and the flat surface portions prevent rotational movement of the friction pad in the support member.

According to another preferred feature of the invention, the cover plate of the casing of the motorised reduction gear unit has a recess formed in it for receiving at least part of the braking means. The transverse dimensions of this recess are slightly greater than the diameter of the support member, but are such as to immobilise the latter, and consequently also to immobilise the output shaft, against any radial movement with respect to the casing.

Further features and advantages of the invention will appear more clearly on a reading of the detailed description of preferred embodiments of the invention which follows, and which is given by way of example only and with reference to the accompanying drawings.

DESCRIPTION OF PREFERRED EMBODIMENTS OF THE INVENTION

Figure 1:
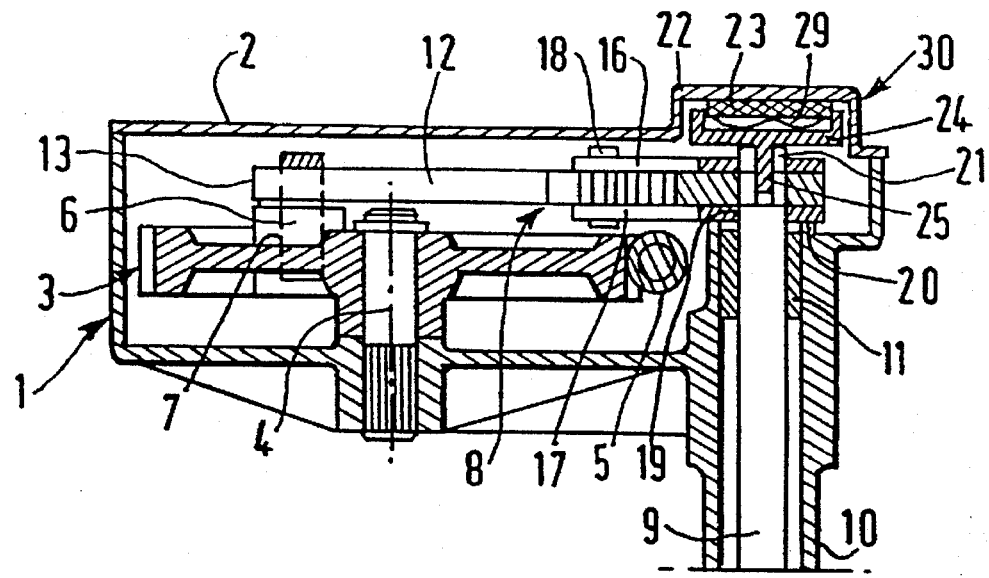
FIG. 1 is a plan view in cross section, showing a motorised reduction gear unit having a braking system in accordance with the invention.
Figure 2:
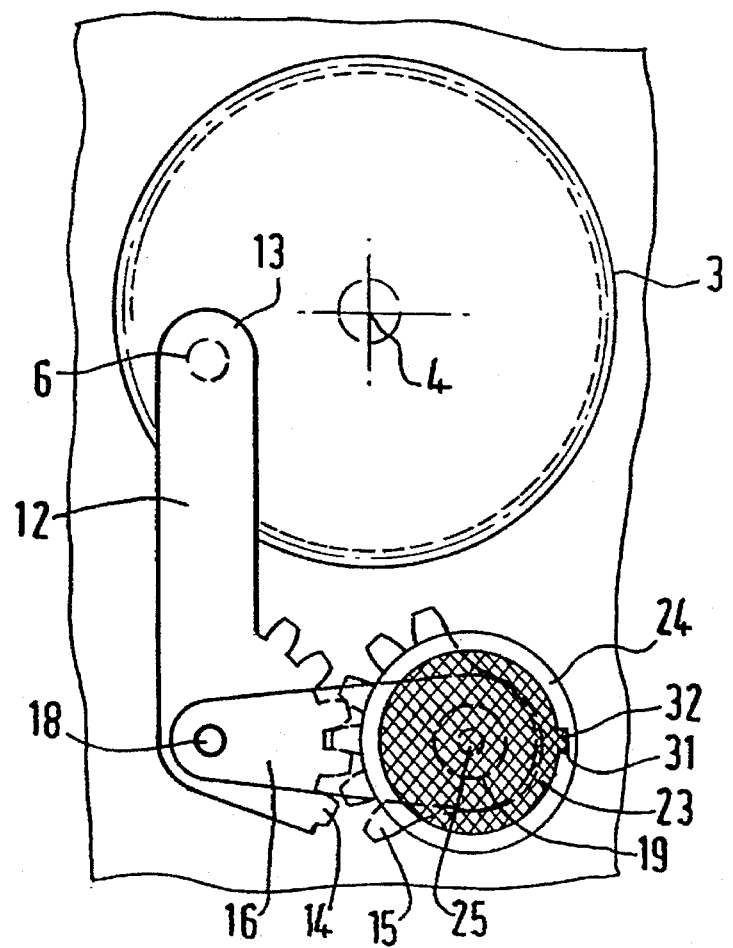
FIG. 2 is a view of the same unit in elevation, in which the cover plate is considered, for convenience, to be transparent.

Referring first to FIGS. 1 and 2, these show a motorised reduction gear unit, in particular for driving a vehicle screen wiper apparatus. The unit comprises a casing 1 having a closure plate 2. The casing contains a toothed wheel 3, which is rotatable about the axis 4 of a mounting pin. The toothed wheel 3 is driven by a worm 5 attached to the rotor shaft of an electric motor which is not shown in the drawings.

The toothed wheel 3 carries a gudgeon pin 6, parallel to the axis 4 and offset eccentrically by a substantial amount with respect to the axis 4. The pin 6 is mounted for free rotation in a recess 7 formed in the toothed wheel 3. The pin 6 is fixed to a crank and connecting rod system 8 which converts the rotary movement of the toothed wheel 3 into alternating rotary movement of an output shaft 9. The output shaft 9 is mounted within a sleeve 10 arranged at the base of the casing 1, and lies on a low friction cradle element 11.

The crank and connecting rod system 8 consists of an arm 12 constituting the connecting rod, having one end 13 coupled to the pin 6. The other end of the arm 12 is formed with a toothed sector 14 which meshes with a further toothed sector 15. The toothed sector 15 is fixed to the output shaft 9, and constitutes the crank of the crank and connecting rod system. Two balance elements 16 and 17, lying on either side of the longitudinal faces of the toothed sectors 14 and 15, retain these toothed sectors in meshing engagement with each other, so as to provide a rigid coupling between the arm 12 and the output shaft 9. The balance elements 16 and 17 are connected together, firstly by means of a pivot pin 18 arranged at one end of the balance members and passing through the arm 12, and secondly by means of an aperture 19 which is arranged at the other end of the balance elements. As regards the balance element 17, the aperture 19 is located between the lower face of the toothed sector 15 and an engagement face 20 in the base of the casing. In the balance element 16, the aperture 19 surrounds the upper end portion 21 of the output shaft 9.

Figure 3:
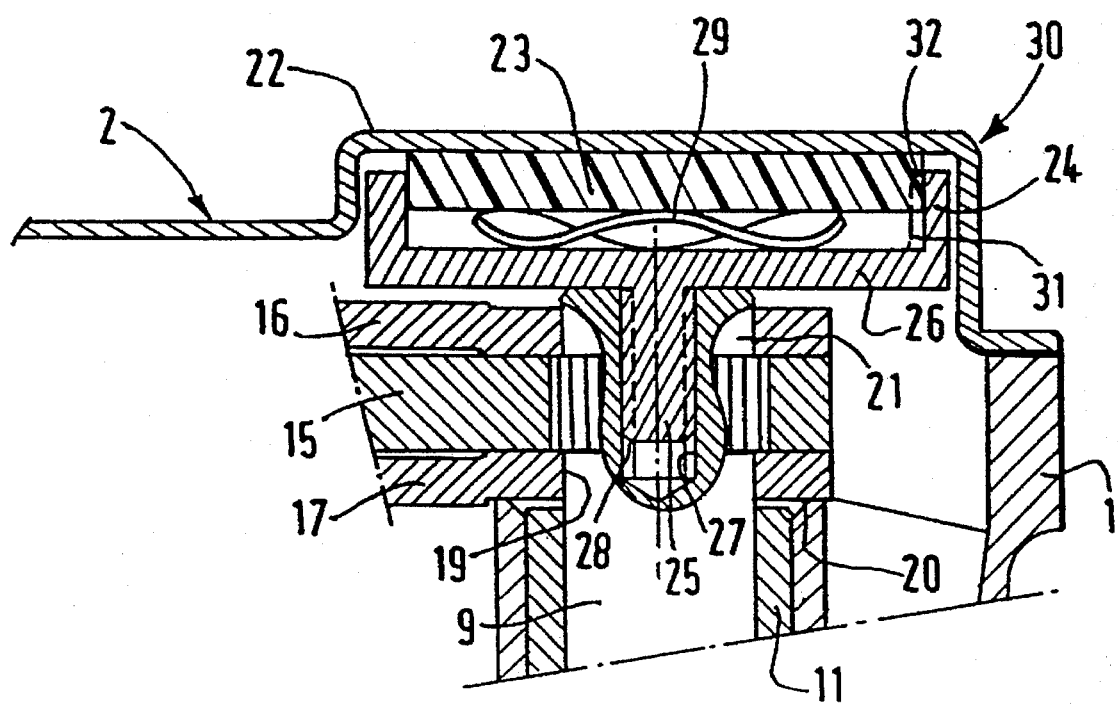
FIG. 3 is a view on a larger scale showing a detail of FIG. 1, and illustrating the braking system situated at the end of the output shaft.

The casing 1 is closed at the top by a cover plate 2, which is formed generally from a thin metallic plate, and which is fixed to the edges of the casing by any known means, for example by screw fasteners or riveting. As can best be seen in FIG. 3, the cover plate 2 has a recess 22, which is press-formed in the plate and which extends outwardly. A circular pad 23, made of a friction material, is mounted in the recess 22. This friction pad 23 fits in a support member 24, which may for example be of steel, and which is fitted into the hollow end of the output shaft 9, with which it is rotatable. The assembly of these components constitutes a braking system, which is indicated in FIG. 3 generally at 30.

The support member 24 comprises a shaft or spigot portion 25 projecting downwardly from a body portion 26 of the member 24. The body portion is in the form of a circular dish. The dish 26 has a flat base and cylindrical sides, the diameter of which is substantially smaller than the transverse width of the recess 22 formed in the cover plate 2.

The support member 24 is fixed to the output shaft 9, for rotation with the latter, by means of a bore 27 formed at the end of the output shaft 9 and having one or more longitudinal grooves 28. The spigot portion 25 of the support member 24 is formed with at least one rib 25A; and the form of this rib, or ribs, matches that of the corresponding groove or grooves 28. The diameter of the spigot portion 25 is substantially equal to that of the bore 27 formed in the end of the output shaft 9, so that there is no clearance between the support member 24 and the output shaft.

The friction pad 23 is free to move axially in the cylindrical body portion 26 of the support member 24. It is fixed to the support member, for rotation with it, by means of at least one longitudinal groove 31 which is formed in the body portion 26, and which cooperates with at least one longitudinal projection 32 formed on the periphery of the pad 23.

A resilient ring 29 is disposed within the body portion 26 of the support member 24, underneath the friction pad 23. The latter is also of resilient material, and is such as to engage in a regular manner within the recess 22 of the cover plate 2. In this connection, in quantity production, if the ring 29 is absent, gaps of several tens of millimeters can exist between the friction pad 23 and the base of the recess 22 in the cover plate, due to slight variations in the dimensions of the components, as for example in the support member, the friction pad, the casing, the cover plate or the crank and connecting rod mechanism.

The resilient ring 29 accordingly provides a resilient and regular engagement of the friction pad 23 within the recess 22 of the cover plate. The resilient ring 29 also takes up any axial clearance that may exist in association with the output shaft 9.

The friction pad 23, by rubbing against the base of the recess 22 in the cover plate, provides a braking action for the output shaft 9, and therefore also for the screen wiper itself. Thus, when the screen wiper, during its wiping action, moves beyond the position defined at 90 degrees with respect to its parked position, the brake, consisting of the friction pad and the base of the recess 22 in the cover plate, prevents the screen wiper from accelerating. In this way, the braking system 30 enables a general regularity to be obtained in the wiping movement, and when the direction of meshing of the toothed sectors changes at each wiping cycle, this takes place without any sudden jolt or shock, and therefore without any noise.

In addition, the braking system has a further advantage, namely that of limiting variations in the load torque of the electric motor. In this connection, since the output shaft 9 is permanently braked, the motor has to supply a torque which is substantially constant in order to drive the output shaft.

The result of adding the resilient ring 29 is further to enable flexible engagement of the friction pad 23 in the recess 22 of the cover plate to be obtained, so that the load torque of the motor is not unduly increased.

The location of the recess 22 of the cover plate 2, the size of which is substantially greater than the diameter of the support member 24, enables the output shaft 9 to be held against movement as regards any radial movements, which can arise (for example) under the action of the transmission forces from the crank and connecting rod system 8.

Thus, not only is the output shaft 9 retained axially by virtue of the resilient ring 29 which takes up any axial clearance, but it is also retained in position in the radial sense with respect to the casing 2, because the recess 22 and the support 24 are complementary to each other.

Figure 4:
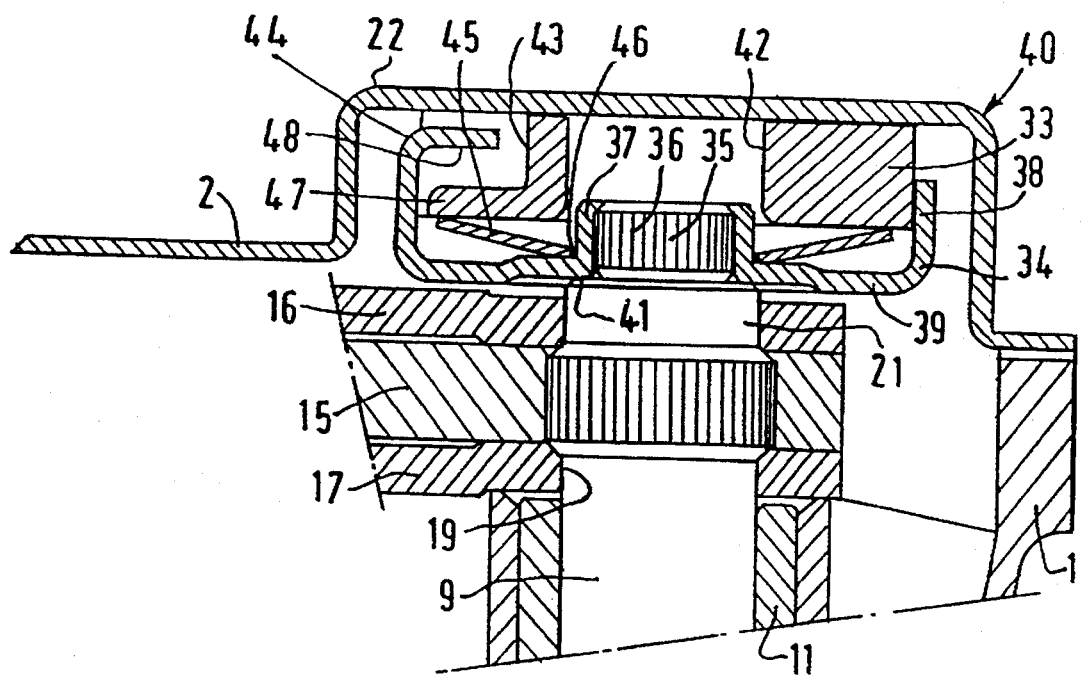
FIG. 4 is a view, on an even larger scale, of the end of the output shaft, illustrating a braking system in another embodiment of the invention.
Figure 5:
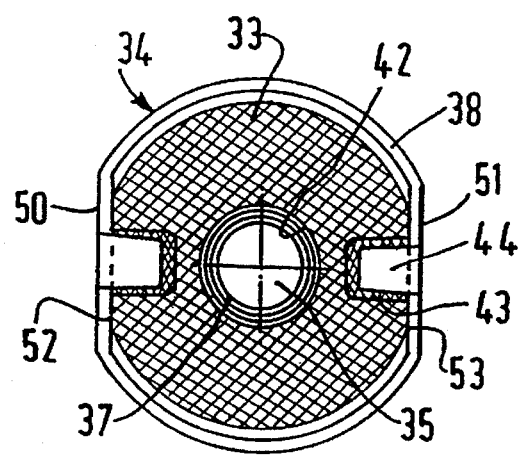
FIG. 5 is a view in elevation showing a detail of FIG. 4 so as to illustrate some of the elements of the invention.

Reference is now made to FIGS. 4 and 5, which show another embodiment of the braking system 40. In this embodiment, those elements which are similar to corresponding elements in FIGS. 1 to 3 carry the same reference numerals, and need not be described again here.

The support member in FIGS. 4 and 5 is indicated at 34. The support member 34 is held at the end of the output shaft 9, on an end portion 35 of the latter. This end portion 35 is cylindrical, and its diameter is smaller than that of the main part of the output shaft 9. A set of splines 36 is formed on the end portion 35, for insertion of the latter in the internal portion of an annular central ring portion 37 of the support member 34.

In this connection, the support member 34 comprises a substantially cylindrical outer portion 38 together with an annular central ring 37; and it will be noted that the depth of the ring portion 37 is less than that of the cylindrical outer portion 38. The support member also has a base portion 39 joining the ring portion 37 to the outer portion 38. The substantially cylindrical outer portion 38 includes two flat sections 50 and 51 (see FIG. 5) which are diametrically opposed to each other. The annular ring portion 37 of the support member has an internal diameter which is smaller than that of the end portion 35 of the output shaft 9, so that the splines 36 of the end portion 35 are inserted into the annular ring portion 37 so as to immobilise the support member 34 against rotation with respect to the output shaft 9. The base portion 39 of the support member is also abutted on the end of the output shaft 9, on a shoulder 41 which is defined by the difference in diameter between the upper end portion proper (21) of the output shaft and the additional end portion 35 which is provided in this particular embodiment.

The friction pad is indicated here at 33, and is disposed within the support member 34. The friction pad 33 has a bore 42 which enables the friction pad to slide axially about the annular central ring portion 37 of the support member.

In this embodiment, the friction pad 33 is substantially circular, but it has two diametrically opposed flat portions 52, 53 formed in its peripheral surface. When the friction pad is fitted into the support member 34, these flat portions 52 and 53 engage with the flat sections 50 and 51 of the support member, so as to prevent rotation of the friction ring within the support member 34.

A resilient ring 45 is also disposed at the base of the support member, underneath the friction pad 33. The ring 45 has a hole through its center, and the diameter of this hole is substantially greater than that of the annular ring portion 37 of the support member 34, so that the ring 45 can be slid on to the base portion of the support member 34.

The friction pad 33 has at least one rabbet 43 which is formed in its periphery, and in which at least one support lug 44 is located. Before the friction pad is fitted into the support member 34, this lug 44 is simply a continuation of the outer portion 38 of the support member. Once the friction pad has been fitted into the support member, the lug 44 is bent back so that it enters the corresponding rabbet 43 in the friction pad, as shown in FIG. 4. FIG. 4 also shows that the rabbet 43 is not formed through the whole thickness of the friction pad 33. In this connection, a portion 47 of the pad lies under the rabbet 43 and engages on the resilient ring 45.

During assembly of the motorised reduction gear unit, so long as the cover plate 2 has not yet been fitted, the resilient ring 45 tends to cause the friction pad 33 to move out of its support member 34, but once the lug (or tongue) 44 has been bent back, its lower surface 48 engages on the portion 47 of the pad, thus preventing further axial movement of the latter, so that the pad is retained in its support member. This facilitates handling of the assembly consisting of the support member 34, resilient ring 45 and friction pad 33, during the process of assembling the unit.

When the unit is in its working condition, the cover plate 2 is fitted on to the casing 1, and engages on the friction pad 33, which compresses the resilient ring 45. Here, a gap is created between the lower surface 48 of the lug 44 and the portion 47 of the friction pad. This enables some degree of wear to take place in the friction pad 33, without the portion 47 of the latter coming into contact with the lug 44, which would have the effect of arresting the friction pad in one position, and nullifying the action of the resilient ring 45.

The method of operation, and the advantages, of the resilient ring 45 and friction pad 33 are the same as those described above in connection with the resilient ring 29 and friction pad 23 in FIG. 3.

It will be understood that the foregoing description of the apparatus is in no way limiting, and that any desirable modification to it may be made without departing from the scope of the present invention. For example, the friction pad may be in the form of a ring member, disposed around the output shaft and in frictional relationship against the sleeve of the casing in which the output shaft rotates.

What is claimed is:

1. A reduction gear unit comprising: a hollow casing; a cover plate fitted over the hollow casing; an output shaft mounted rotatably in the casing; and a mechanism within the casing having a mounting pin fixed in the casing, a toothed wheel carried on the mounting pin for rotation on it, a crank and connecting rod system coupled to the toothed wheel so as to be driven thereby, and coupled to the output shaft so as to convert continuous rotary movement of the toothed wheel to alternating rotary movement of the output shaft, wherein the unit further includes rotary braking means carried by the output shaft for applying braking to the rotation of the latter, the braking means includes a friction pad and means connecting the friction pad to the output shaft for rotation with the latter, the friction pad being so disposed as to rub on a portion of the casing.

2. A reduction gear unit according to claim 1, wherein the casing defines a recess receiving at least part of the braking means.

3. A reduction gear unit according to claim 2, further comprising a support member for supporting the rotary braking means and wherein the recess in the casing has a transverse width substantially greater than the diameter of the support member.

4. A reduction gear unit according to claim 1, wherein the friction pad is disposed at the end of the output shaft.

5. A reduction gear unit comprising: a hollow casing; a cover plate fitted over the hollow casing; an output shaft mounted rotatably in the casing; and a mechanism within the casing having a mounting pin fixed in the casing, a toothed wheel carried on the mounting pin for rotation on it, a crank and connecting rod system coupled to the toothed wheel so as to be driven thereby, and coupled to the output shaft so as to convert continuous rotary movement of the toothed wheel to alternating rotary movement of the output shaft, wherein the unit further includes rotary braking means carried by the output shaft for applying braking to the rotation of the latter, a support member disposed at the end of the output shaft, the friction pad being carried by the support member, and means coupling the friction pad to the support member for rotation with it, the friction pad being disposed so as to rub on the cover plate.

6. A reduction gear unit according to claim 5, wherein the support member is in the form of a dish, the friction pad having a shape complementary to the dish.

7. A reduction gear unit according to claim 5, wherein the support member has a lateral portion defining at least one groove, the friction pad having a peripheral projection cooperating with the said groove.

8. A reduction gear unit according to claim 6, wherein the support member has a lateral portion defining at least one flat peripheral surface portion.

9. A reduction gear unit according to claim 8, wherein the said lateral portion defines two diametrically opposed flat surface portions.

10. A reduction gear unit according to claim 5, further including a resilient engagement means contained in the support member and acting on the friction pad.

11. A reduction gear unit according to claim 10, wherein the resilient engagement means comprises a resilient ring disposed under the friction pad.

12. A reduction gear unit according to claim 11, wherein the resilient ring is circular, and has a diameter smaller than the transverse dimension of the friction pad.

13. A reduction gear unit according to claim 5, wherein the support member has a lateral portion having an outer edge, and a lug projecting from the said outer edge and bent back radially inwardly, the friction pad having a peripheral rabbet, the said lug being disposed in the rabbet.

14. A reduction gear unit according to claim 5, wherein the output shaft has an end portion defining a bore therein, the support member having a spigot portion carried in the said bore and securing the support member to the output shaft for rotation with it.

15. A reduction gear unit according to claim 14, wherein the said spigot portion of the support member defines at least one longitudinal rib, the said bore in the end portion of the output shaft having a groove therein engaging the said rib.

16. A reduction gear unit according to claim 5, wherein the output shaft has an end portion, the support member including an annular central ring surrounding the said end portion of the output shaft and secured on the latter.

17. A reduction gear unit according to claim 5, wherein the friction pad is generally circular and has a diameter substantially equal to the internal diameter of the support member.

18. A reduction gear unit according to claim 17, wherein the friction pad has at least one circumferential flat surface portion.

19. A reduction gear unit according to claim 18, wherein the friction pad has two diametrically opposed circumferential flat surface portions.

* * * * *